(12) United States Patent
Fernandez

(10) Patent No.: US 8,342,543 B2
(45) Date of Patent: *Jan. 1, 2013

(54) METHOD FOR DRAINING AND TRANSPORTING LARGE DIAMETER HOSES

(75) Inventor: Javier Fernandez, Mukwonago, WI (US)

(73) Assignee: Roll N Rack LLC, Mukwonago, WI (US)

( * ) Notice: Subject to any disclaimer, the term of this patent is extended or adjusted under 35 U.S.C. 154(b) by 435 days.

This patent is subject to a terminal disclaimer.

(21) Appl. No.: 12/647,615

(22) Filed: Dec. 28, 2009

(65) Prior Publication Data

US 2010/0181411 A1    Jul. 22, 2010

Related U.S. Application Data

(63) Continuation-in-part of application No. 11/577,689, filed as application No. PCT/US2004/035128 on Oct. 22, 2004, now Pat. No. 7,661,683.

(51) Int. Cl.
*B62B 1/12* (2006.01)
(52) U.S. Cl. .............. 280/47.24; 280/47.131; 280/47.34
(58) Field of Classification Search ............. 280/47.131, 280/47.17, 47.18, 47.2, 47.24, 47.33, 47.34; 242/395, 403.1, 448.1; 137/355.12, 355.16, 137/355.17, 355.19, 355.26–355.28; D12/13; D23/214, 219
See application file for complete search history.

(56) References Cited

U.S. PATENT DOCUMENTS

| 764,344 | A | * | 7/1904 | Buckelew | 414/458 |
|---|---|---|---|---|---|
| 2,549,498 | A | * | 4/1951 | McAlpine et al. | 248/89 |
| 2,685,419 | A | * | 8/1954 | Helberg | 242/388.1 |
| 3,124,321 | A | * | 3/1964 | Rylott et al. | 242/532.6 |
| 4,056,241 | A | * | 11/1977 | Yates | 242/391 |
| 4,057,198 | A | * | 11/1977 | Whitfield | 242/532.6 |
| 4,265,414 | A | * | 5/1981 | Spradling | 242/532.6 |
| 4,288,047 | A | * | 9/1981 | Barry et al. | 242/395 |
| 4,366,933 | A | * | 1/1983 | Broussard | 242/557 |
| 4,452,135 | A | * | 6/1984 | Hayes | 100/153 |
| 4,732,345 | A | * | 3/1988 | Golden | 242/539 |
| 5,033,690 | A | * | 7/1991 | McIver | 242/532.6 |
| 5,211,351 | A | * | 5/1993 | DeClerck | 242/595.1 |
| 5,388,609 | A | * | 2/1995 | Ghio et al. | 137/355.27 |
| 5,505,404 | A | * | 4/1996 | Dubreuil | 242/532.6 |
| 5,722,453 | A | * | 3/1998 | Huxhold | 137/355.28 |
| 5,758,685 | A | * | 6/1998 | Tisbo et al. | 137/355.27 |
| 6,135,139 | A | * | 10/2000 | Blake, Jr. | 137/355.18 |
| 6,561,450 | B1 | * | 5/2003 | Walsh | 242/395 |
| 6,591,744 | B2 | * | 7/2003 | Peek | 100/171 |
| 7,748,418 | B2 | * | 7/2010 | Johnson | 141/231 |
| 2002/0185017 | A1 | * | 12/2002 | Peek | 100/155 R |

* cited by examiner

*Primary Examiner* — J. Allen Shriver, II
*Assistant Examiner* — Travis Coolman
(74) *Attorney, Agent, or Firm* — Joseph S. Heino; Patrick M. Bergin

(57) ABSTRACT

A method for draining and transporting large diameter hoses includes providing a frame that is movable by virtue of a pair of wheels. The center of gravity of the frame, and of the frame and a coiled hose situated on it, is located directly above the wheels. The frame includes a front toe for facilitating the rolling of a coiled segment of hose up and onto the frame. The frame includes horizontally disposed rollers that facilitate removal of the coil from the frame. The frame also includes a guide bar to assist in maintaining the coil in an upright position during transport. An attachment is removably secured to the frame to allow a portion of the hose to drape over an elevated roller to extract water from the hose and, alternatively, to allow a power-driven winding rod wind the hose into a coil.

12 Claims, 9 Drawing Sheets

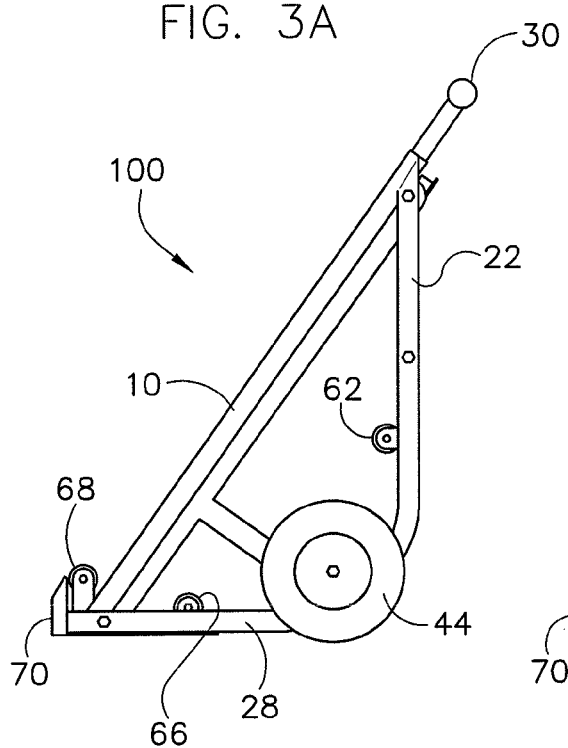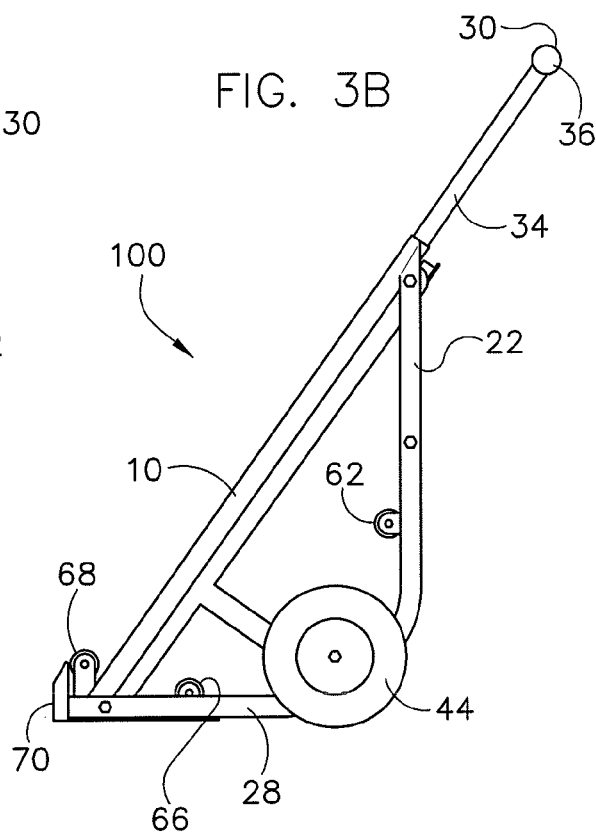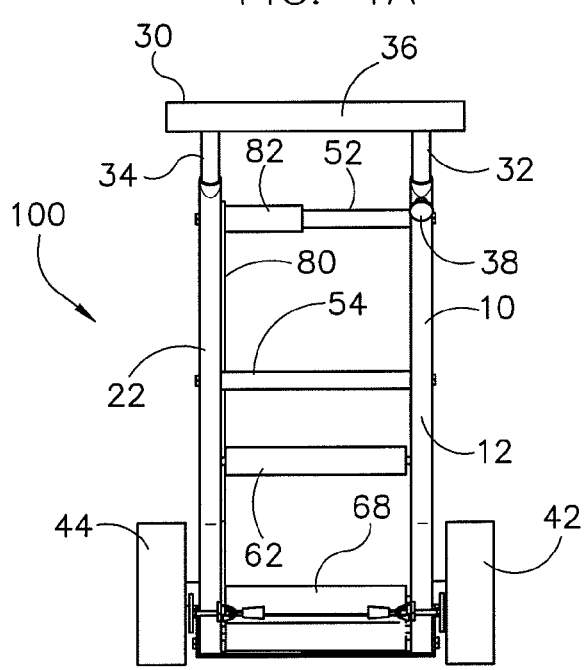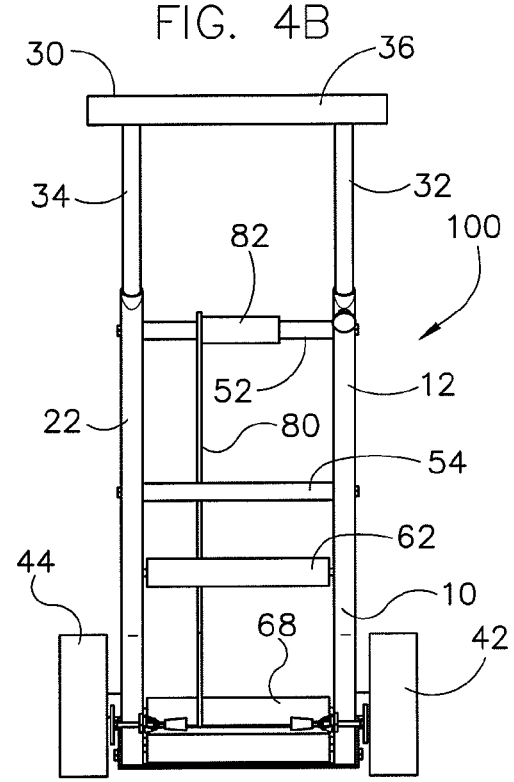

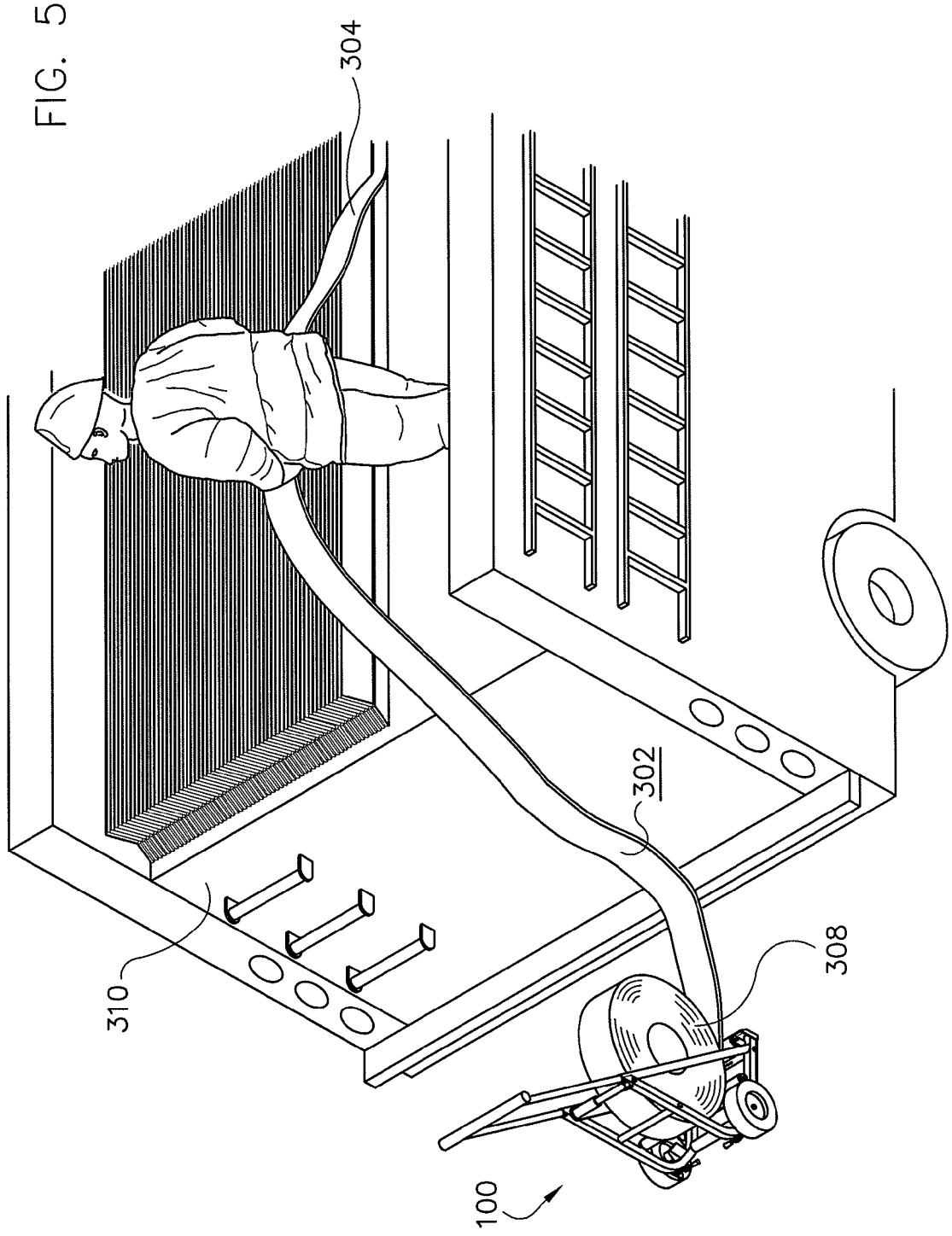

METHOD FOR DRAINING AND TRANSPORTING LARGE DIAMETER HOSES

This application is a continuation-in-part of U.S. application Ser. No. 11/577,689 filed Apr. 20, 2007 now U.S. Pat. No. 7,661,683 which claims priority to PCT App. No. PCT/US04/35128 filed Oct. 22, 2004.

FIELD OF THE INVENTION

The present invention relates generally to carts and other devices for transporting items or materials. More particularly, it relates to a method that can be used for draining water from a large diameter hose, such as a fire hose, and for aiding a firefighter in the transporting and reloading of a coiled fire hose onto a fire truck.

BACKGROUND OF THE INVENTION

One of the most fundamental ways that a firefighter can extinguish fire is to direct a spray of water onto the fire. Since most fires occur in areas that are not in close proximity to a water supply, the water supply must be brought to the fire location by using one or more fire hoses. The typical connection of a fire hose is to a fire truck which is, in turn, connected to a fire hydrant which provides the source of water. The opposite end of the fire hose is connected to a nozzle that is adapted for spraying water in a quantity and at a rate that is suitable for fire fighting. To accommodate the quantities required, it is generally required that such fire hoses be of the large diameter hose variety, designated by the acronym "LDH" as will be hereinafter used. The LDH is typically fabricated of a flexible material. When the LDH fills with pressurized water, it assumes a substantially round or oblate cross-sectional configuration. When the LDH is not filled with water, it flattens out and has virtually no cross-sectional opening. In this flattened state, the LDH is able to be rolled into a coil. This coil can then be stood on end, in an almost wheel-like fashion.

A common LDH used today can be 100 feet in length, 4 inches in diameter and 75 lbs in weight. The LDH can be even larger in diameter with a corresponding increase in weight.

During its deployment from the bed or deck of a fire truck, the LDH is pulled and laid out on the ground, in conjunction with other like segments of LDH, in a generally straight and flat position and is then pressurized with water, the end of the LDH being fitted with a nozzle. After use, the LDH must be collected, drained, transported back to the fire truck and re-stored on the deck of the fire truck for subsequent re-use.

In the experience of this inventor, a typical method for extracting or draining the water from the LDH is to have a firefighter simply lift the fire hose onto his or her shoulder and walk along the length of the LDH, thereby using the force of gravity to drive water from the interior of the LDH towards one open end or the other. The LDH is then rolled into a coil. This coil, the weight of which is not insubstantial as alluded to earlier, is then transported back to and lifted onto the fire truck, usually through the efforts of several firefighters. Also in the experience of this inventor, there is a substantial risk of back injury which can and does occur because of the physical exertion that is required to accomplish the lifting and re-storage of the LDH following a fire fight.

Accordingly, what is needed is a method that will facilitate the extraction of water from the LDH, that will facilitate the winding-up of the LDH into a coil, and that will allow for the transport and storage of the drained LDH in a way that requires far less physical exertion by the firefighter and which will actually require only a minimal number of firefighters to be used to reload and restack the LDH onto the deck of the fire truck. What is also needed is such a method that can be used with LDH of varying diameters and lengths.

SUMMARY OF THE INVENTION

Accordingly, a primary object of the present invention is to provide a new, useful and non-obvious method for facilitating the removal of water from an LDH after the LDH has been used in a fire fight. Another object of the present invention is to provide such a method that can also be used to wind the LDH into a coil and/or to transport a coiled LDH from the drain site to the fire truck onto which the LDH must be re-stacked. Another object of the present invention is to provide such a method whereby LDH of different diameters can be transported in this fashion.

In accordance with the aforementioned objectives of the present inventions, there is provided a method for draining, winding and transporting large diameter hoses of the type used in fire fighting. The method is used with an apparatus that includes a frame and retractable handle. The frame is movable by virtue of a pair of wheels attached to the bottom-most portion of the frame. The frame is configured such that the center of gravity of the frame, and of the frame and a coiled LDH situated on it, is located directly above the wheels. The front of the frame includes a toe for facilitating the rolling of a coiled segment of LDH up and onto the frame. The frame includes a number of horizontally disposed rollers that facilitate removal of the LDH coil from the frame when the LDH is being re-stacked onto the fire truck. The frame also includes a guide bar to assist in maintaining the LDH coil in an upright position during transport. The frame also utilizes attachments.

One embodiment of an attachment that is provided is removably secured to the frame to allow the user to drape a portion of the LDH over an attachment roller. The user can then simply walk behind the apparatus, stepping directly on the LDH, and pushing the apparatus along and under the length of LDH to extract water from the LDH. Another embodiment of an attachment is also removably secured to the frame to allow the user to catch one end of the LDH within a receiver and then actuate a motor to drain and wind the LDH into a coil as the user walks behind the apparatus.

The method and apparatus can be used repeatedly until all segments of LDH used are drained and reloaded onto the fire truck following a run. The apparatus with either embodiment of attachment, or by itself, can then be stowed on the fire truck for future use.

The foregoing and other features of the method of the present invention will be apparent from the detailed description that follows.

BRIEF DESCRIPTION OF THE DRAWINGS

FIG. 3A is a reduced right side elevational view of the apparatus shown in FIG. 1 and illustrating the handle in a retracted position.

FIG. 3B is the same view of the apparatus as shown in FIG. 3A but showing the handle in an extended position.

FIG. 4A is a reduced rear elevational view of the apparatus shown in FIG. 1 and illustrating the handle in a retracted position.

FIG. 4B is the same view of the apparatus as shown in FIG. 4A but illustrating the handle in an extended position and illustrating the LDH alignment bar in an alternate location.

FIG. 5 is a much reduced top, rear and left side perspective view of the apparatus shown in FIG. 1 and illustrating use of the apparatus in replacing the LDH to the upper deck of a fire truck.

DETAILED DESCRIPTION

Figure 1:
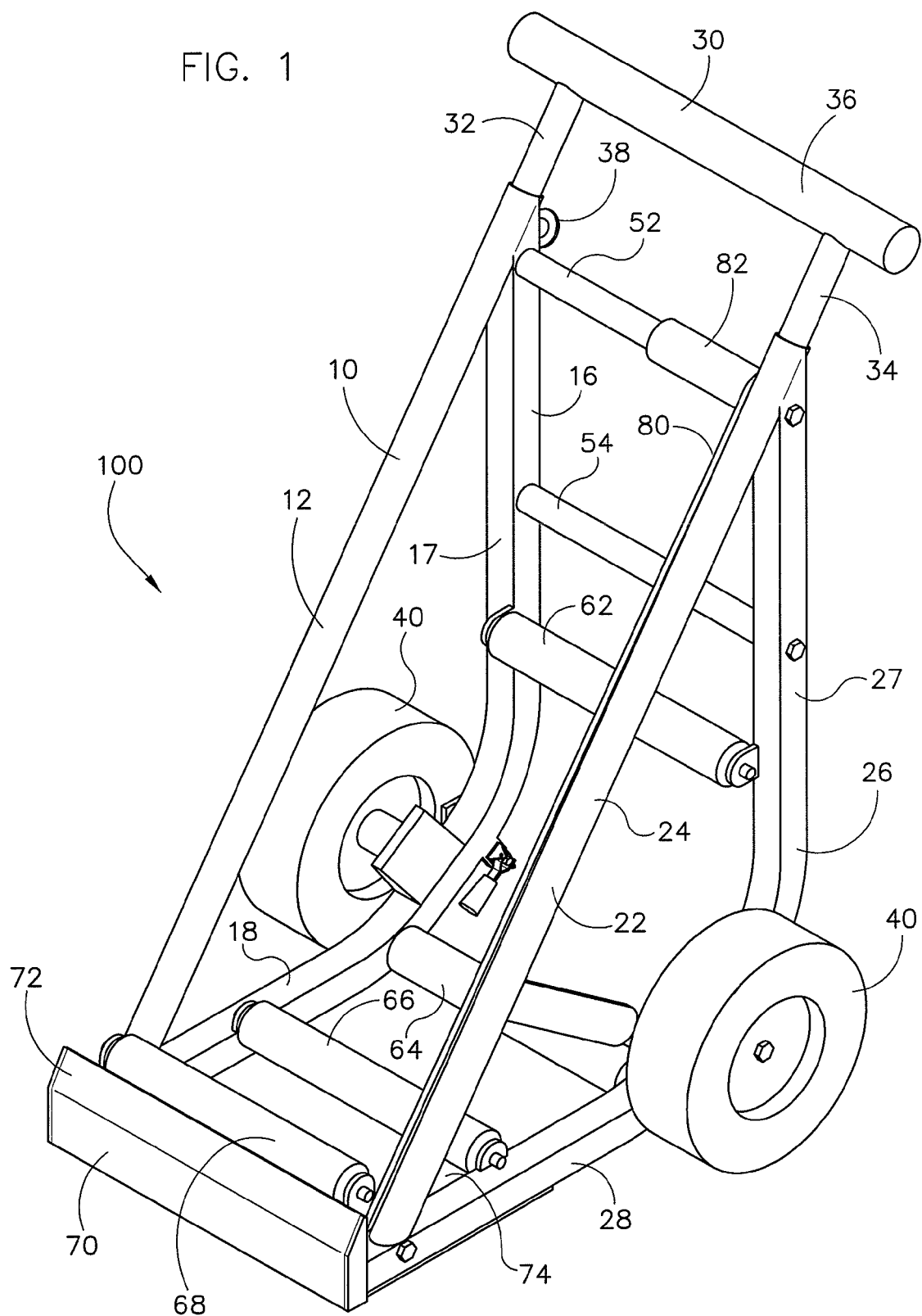
FIG. 1 is a front, top and right side perspective view of an LDH transporting apparatus that is constructed in accordance with the present invention.
Figure 6:
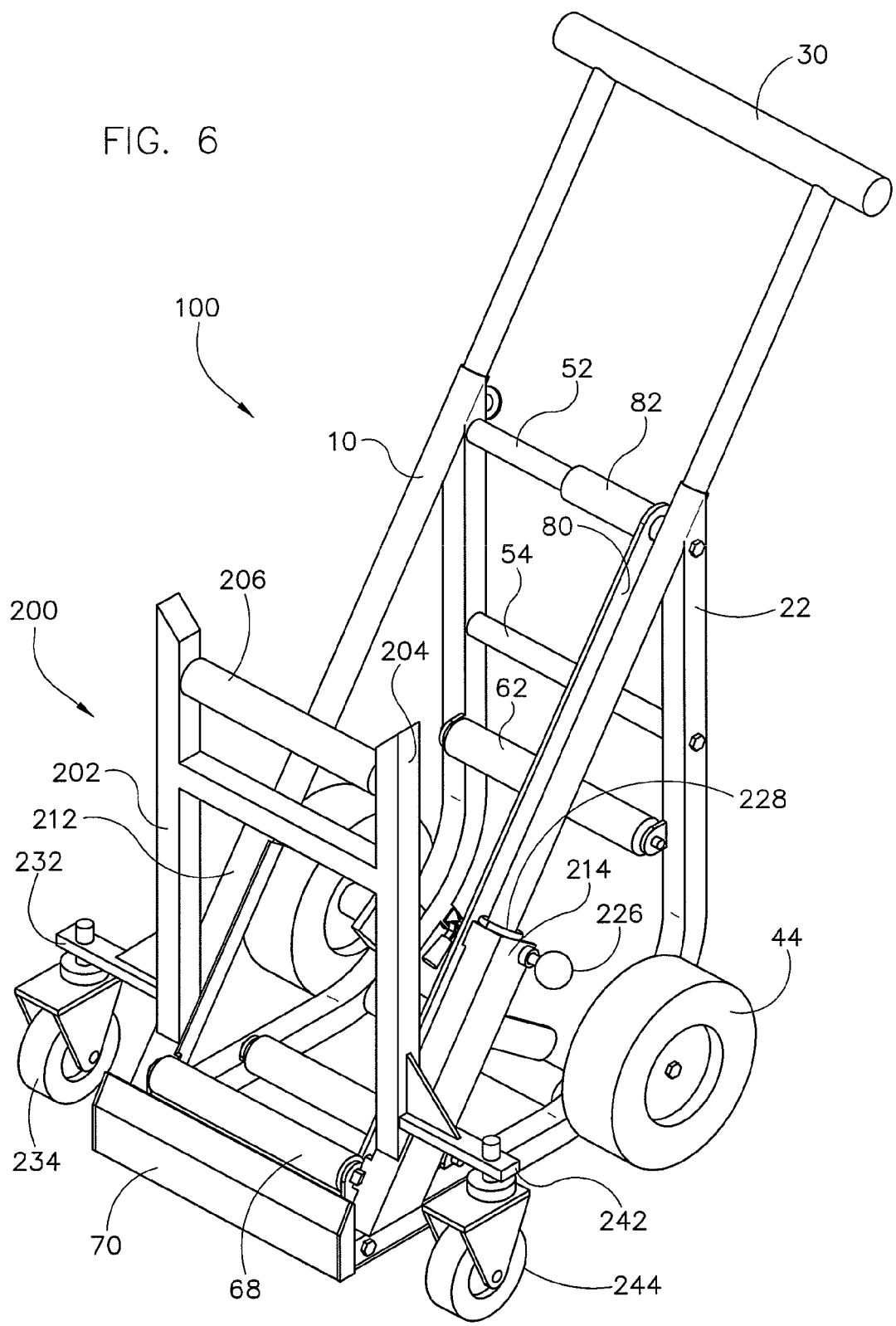
FIG. 6 is the same perspective view of the apparatus as is shown in FIG. 1 but showing the first embodiment of an LDH draining attachment secured to the apparatus.

Referring now to the drawings in detail, wherein like numbered elements refer to like elements throughout, FIGS. 1 and 6 illustrate a large diameter hose draining and transporting apparatus, generally identified 100, constructed in accordance with the present invention. The difference between the aforementioned figures is that FIG. 1 illustrates the apparatus 100 without a hose draining attachment while FIG. 6 illustrates the apparatus 100 with one embodiment of the hose draining attachment, the attachment being generally identified 200. Similar to FIGS. 1 and 6 is FIG. 9 which illustrates the apparatus with a second embodiment of a hose draining and hose winding attachment, the second embodiment of the attachment being generally identified 400.

As shown in FIG. 1, the apparatus 100 is comprised generally of a frame 10, a push/pull handle 30, and a pair of wheels 40.

In the preferred embodiment, the frame 10 has a first side frame member 12 and second side frame member 22, each essentially being a cooperative mirror-image of the other. The first and second side frame members 12, 22 lie in substantially vertical planes and are generally parallel planar with respect to one another. See also FIGS. 4A and 4B. The first side frame member 12 includes a tubular first side frame member top 14 and a tubular first side frame member bottom 16. As shown, the cross-sectional profile of the first side frame member top and bottom 14, 16, is circular and square, respectively. Such shape is not, however, a limitation of the apparatus of the present invention. Similarly, the second side frame member 22 includes a second side frame member top 24 and a second side frame member 26 bottom, both of which are tubular in construction and the same in cross-sectional geometry. In normal position, the side frame member bottoms 16, 26 include a generally vertical portion 17, 27, respectively, and a generally horizontal portion 18, 28, respectively.

Figure 2:
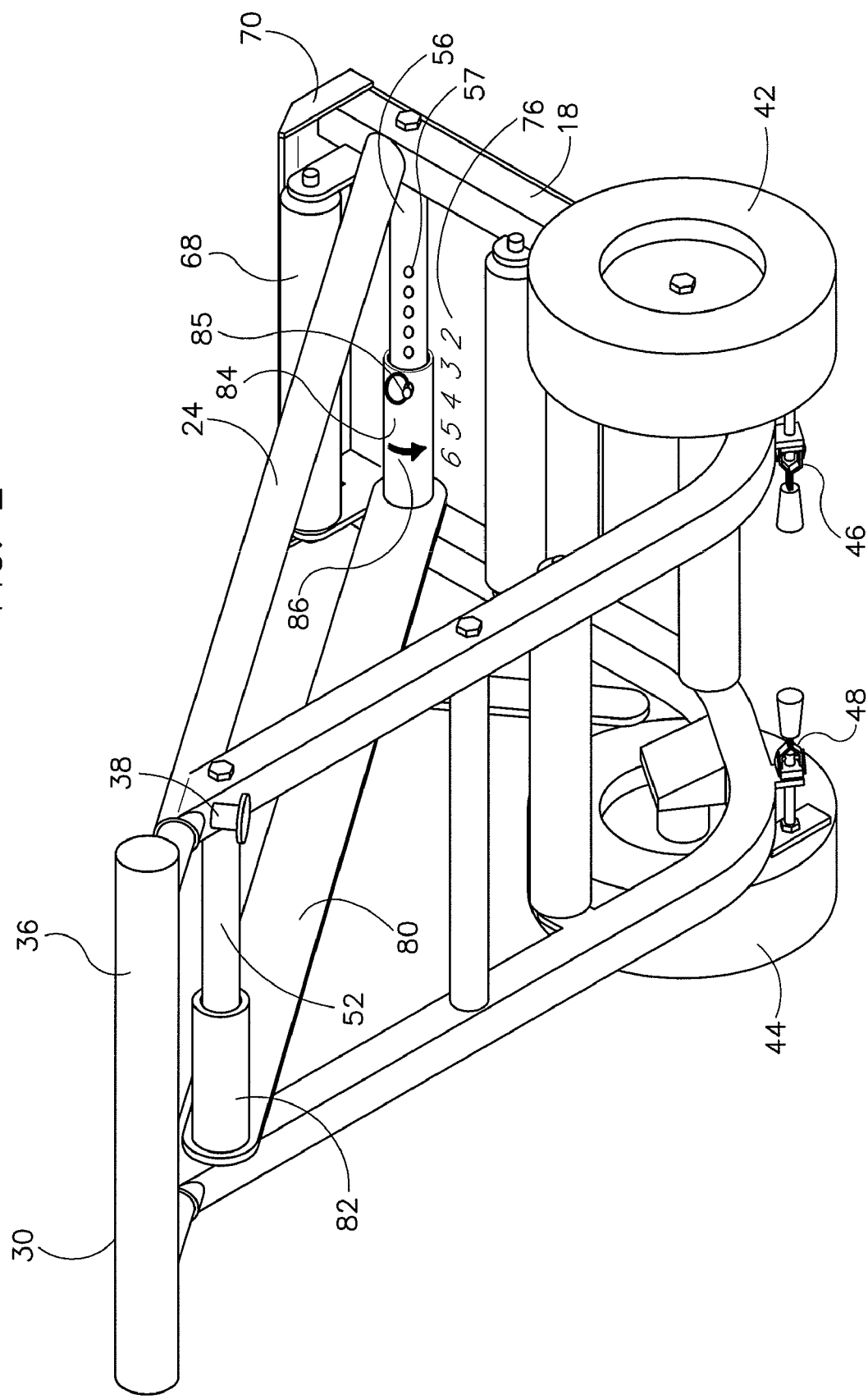
FIG. 2 is a rear, top and left side perspective view of the apparatus shown in FIG. 1.

The side frame member tops 14, 24 are functionally adapted to receive one side member 32, 34, respectively, of the handle portion 30. Each handle side member 32, 34 terminates at its upper end in a horizontal hand grip portion 36. In the preferred embodiment, the height of the handle member 30 is adjustable and the relative position of the handle 30 is fixable. See FIGS. 3A, 3B, 4A and 4B. This handle 30 adjustment is also illustrated in comparing FIG. 1 to FIG. 6, the former showing the handle 30 in a retracted position and the latter showing the handle 30 in an extended position. A spring-loaded handle retention means 38 is provided, as is shown in FIG. 2. The means for maintaining the handle 30 in either position is any that may be well known in the art and is not a limitation of the present invention.

Extending between the first and second side frame members 12, 22 is a plurality of horizontally disposed support members 52, 54, 56. See also FIG. 2. Also disposed between the first and second side frame members 12, 22 is a plurality of roller members 62, 64, 66, 68. The roller members 62, 64, 66, 68 are disposed in an arcuate fashion along the frame 10 in such a way that each cooperates with the other in moving a generally circular object, such as a coiled LDH 302, along them in a rotating fashion.

Forward of the horizontal portions of the first and second side frame members 12, 22 is a hose coil lifting toe 70 that includes a slanted front face 72 and a bottom toe surface 74. The purpose and function of this portion of the apparatus 100 will be discussed later in this detailed description.

Referring now to FIGS. 2 and 4B in particular, it will be seen that a guide bar 80 extends between the upper-most frame support member 52 and the lower-most frame support member 56. Specifically, and at each end of the guide bar 80 is an upper guide bar sleeve 82 and a lower guide bar sleeve 84. The upper bar sleeve 82 is longitudinally movable along the upper-most frame support member 52. Similarly, the lower guide bar sleeve 84 is longitudinally movable along the lower-most frame support member 56. The lower-most frame support member 56 includes a number of apertures 57 defined in it. The lower guide bar sleeve 84 includes a spring-loaded pin 85 that can be received by the support member apertures 57. The lower guide bar sleeve 84 also includes a marker or other indicator 86. As shown in FIG. 2, it will be seen that the plate portion 74 of the toe 70 includes indicia 76 that may be used to position the guide bar 80 at a given position within the frame 10 depending upon the size of LDH 302 that is being transported via the apparatus 100.

As is also shown in FIG. 2, the wheels 42, 44 are disposed at a point that is just below the center of gravity of the apparatus. Each wheel 42, 44 is separately rotatable such that the user may negotiate corners and the like. Additionally, each wheel 42, 44 is provided with a locking means 46, 48, respectively, to prevent wheel rotation when such is desired or required. As an intended function of this apparatus 100, the wheels 42, 44 can be locked to allow a coiled LDH 308 to be rotatably removed from the apparatus 100, as is shown in FIG. 4. It is to be understood that any suitable locking means may be employed for this function without deviating from the scope of the present invention.

Figure 7:
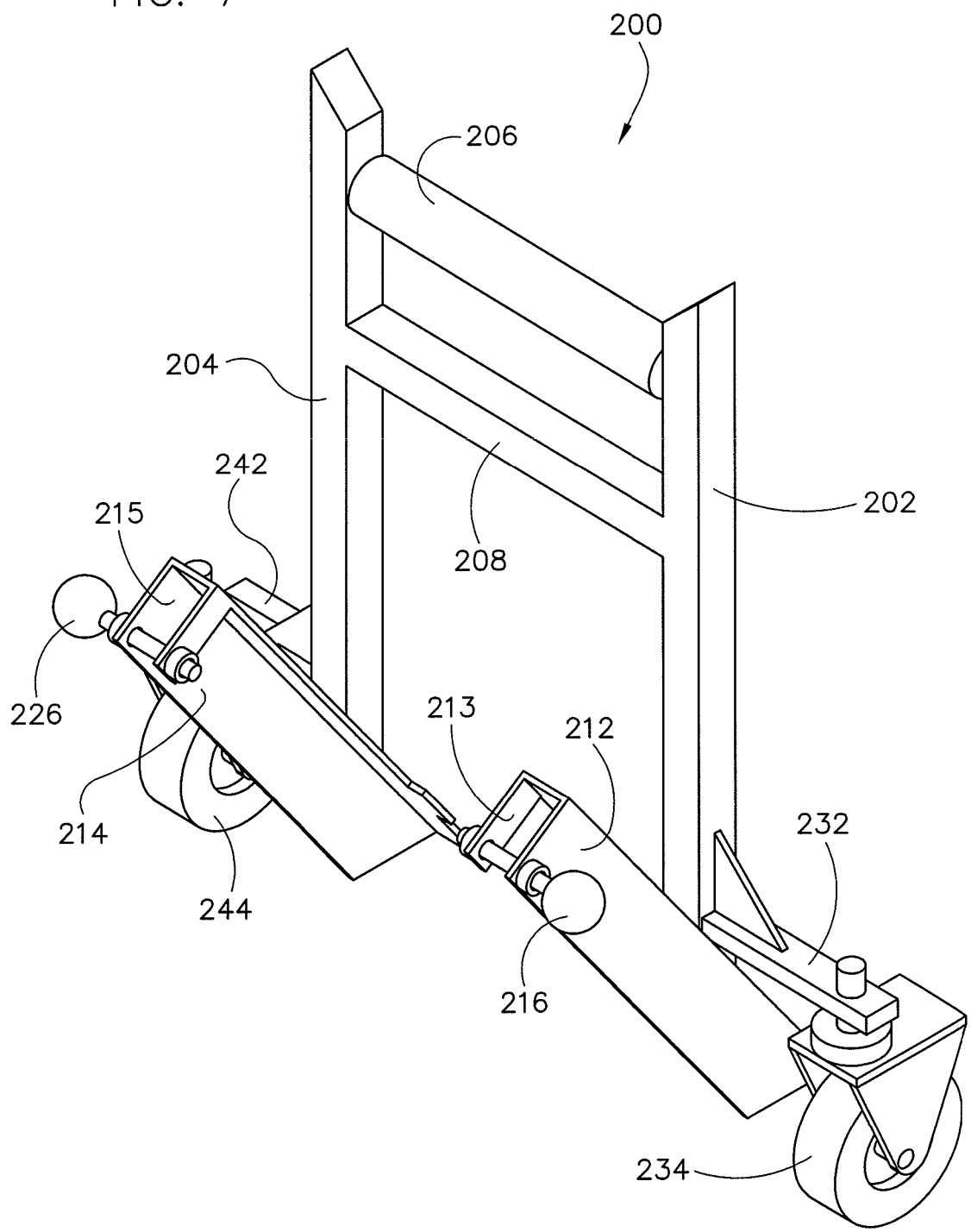
FIG. 7 is a slightly enlarged rear, top and left side perspective view of the LDH draining attachment shown in FIG. 6.

As previously discussed, one embodiment of a detachable portion of the apparatus 100 of the present invention is a first embodiment of the LDH draining attachment 200, which can be quickly and easily attached to or removed from first and second side frame members 12, 22. In particular, the first embodiment of the draining attachment 200 is secured to the side frame member tops 14, 24, respectively, thereof. As shown in FIGS. 6 and 7, it will be seen that this attachment 200 includes a first side upright member 202 and second side upright member 204. Extending between the first and second side upright members 202, 204 is a horizontal member 208. Also included is a roller 206. The roller 206 is elevated and horizontally disposed. It is similar in construction to the other rollers 62, 64, 66, 68. The purpose and function of the elevated roller 206 will become apparent later in this description.

The attachment 200 also includes a first side support member 212 and a second side support member 214. The first side support member 212 includes a channel 213 defined within it. Similarly, the second side support member 214 includes a channel 215 defined within it. In the preferred embodiment, the channel 213 of the first side support member 212 is functionally adapted to overlay the tubular top 14 of the first side frame member 12. Similarly, the channel 215 of the second side support member 214 is functionally adapted to overlie the tubular top 24 of the second side frame member 22. The lowermost portion of each side member 212, 214 is held down by a tab 236, 246, respectively. See, in particular, FIG. 6. Each side member 212, 214 is also prevented from upward movement along the side frame members 12, 14 by a ring-like stop member 218, 228 that is secured to the frame members 12, 14, respectively. In the preferred embodiment, the stop members 218, 228 are formed of two halves of a ring, each half being secured to the other by a screw means, the ring being held in place by friction and pressure. Such is not, however, a limitation of the present invention.

The attachment 200 is further supported by wheel struts 232, 242 extending outwardly from the first side support 212 and the second side support 214, respectively. Attached to each of the wheel struts 232, 242, is a wheel 234, 244, respectively. The attached wheels 234, 244 may be of a swivel type that is capable of moving the attachment 200 in any direction as needed. The attachment 200 is secured to the first and second side frame members 12, 22 by means of pull knobs 216, 226 that are located to either side of the first side support member 212 and the second side support member 214 of the attachment 200.

Figure 9:
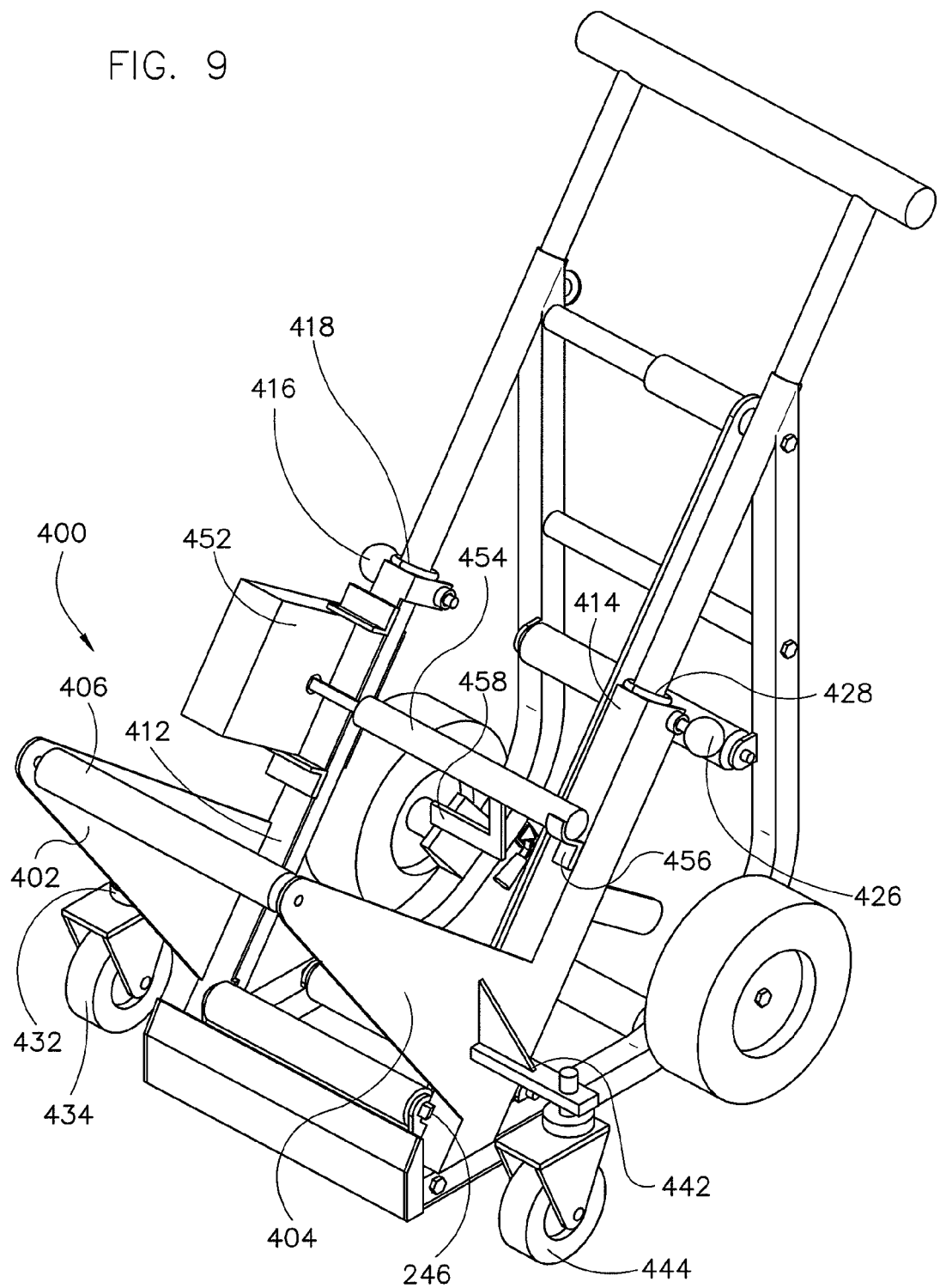
FIG. 9 is the same perspective view of the apparatus as is shown in FIGS. 1 and 6 but showing a second embodiment of an LDH draining and winding attachment secured to the apparatus.

A second embodiment of the detachable portion of the apparatus 100 of the present invention is an LDH draining and winding attachment 400, which, like its counterpart, can also be quickly and easily attached to or removed from first and second side frame members 12, 22. As shown in FIG. 9, this second embodiment of the attachment 400 is secured to the side frame member tops 14, 24, respectively, thereof, much in the same way as the first embodiment attachment 200 is secured to the apparatus 100. This attachment 400 includes a first side forward member 402 and second side forward member 404. Extending between the first and second side forward members 402, 404 is an elevated roller 406. The roller 406 is horizontally disposed and is similar in construction to the other rollers 62, 64, 66, 68. The purpose and function of the elevated roller 406 is identical to that of the elevated roller 206 of the first embodiment. Note, however, that the roller 406 of the second embodiment attachment 400 is positioned more forwardly so as to allow a coil 308 of LDH 302 to be wound behind the roller 406, the roller 406 still being used as a hose draining device as will become apparent later in this description.

The second embodiment of the attachment 400 also includes a first side support member 412 and a second side support member 414. The first side support member 412 includes a channel (not shown) defined within it. Similarly, the second side support member 414 includes a channel (not shown) defined within it. In this second embodiment, the channel of the first side support member 412 is functionally adapted to overlay the tubular top 14 of the first side frame member 12. Similarly, the channel of the second side support member 414 is functionally adapted to overlie the tubular top 24 of the second side frame member 22. The lowermost portion of each side member 412, 414 is held down by the tabs 236, 246, respectively, as previously described. Each side member 412, 414 is also prevented from upward movement along the side frame members 12, 14 by a ring-like stop member 418, 428 that is secured to the frame members 12, 14, respectively.

The second embodiment attachment 400 is further supported by wheel struts 432, 442 extending outwardly from the first side support 412 and the second side support 414, respectively. Attached to each of the wheel struts 432, 442, is a wheel 434, 444, respectively. The attached wheels 434, 444 may be of a swivel type that is capable of moving the winding attachment 400 in any direction as needed. The winding attachment 400 is secured to the first and second side frame members 12, 22 by means of pull knobs 416, 426 that are located to either side of the first side support member 412 and the second side support member 414 of the attachment 400.

The second embodiment attachment 400 also includes a motor 452 that drives a winding rod 454 that extends between the first and second side support members 412, 414. The winding rod 454 is supported at one end by the motor 452 and at the opposite end by a catch 456. The winding rod 454 includes a keeper 458 that can be used to engage the one end of the LDH 302 that is to be wound. As shown, the winding attachment motor 452 and the catch 456 are secured to the attachment 400 in such a way that allows the winding rod 454 to be withdrawn from the LDH coil 308 to allow subsequent unwinding of the coil 302 as described below.

The second embodiment attachment 400 could also be configured in such a way that one end (not shown) of the LDH 302 would be "captured" between inwardly movable and opposing clamps (also not shown). The clamps are attached to a shorter length of a winding rod 454 that would be supported by and extend inwardly from each of the first and second side supports 412, 414, respectively. It would also be desirable in such an alternative configuration to provide a motor 452 at each side support 412, 414 of the attachment 400 so as to provide equal torque to the hose end and synchronized rotation as the motors 452 would wind the LDH 302 into a coil 308. Other configurations could also be devised without deviating from the scope of the present invention.

Figure 8:
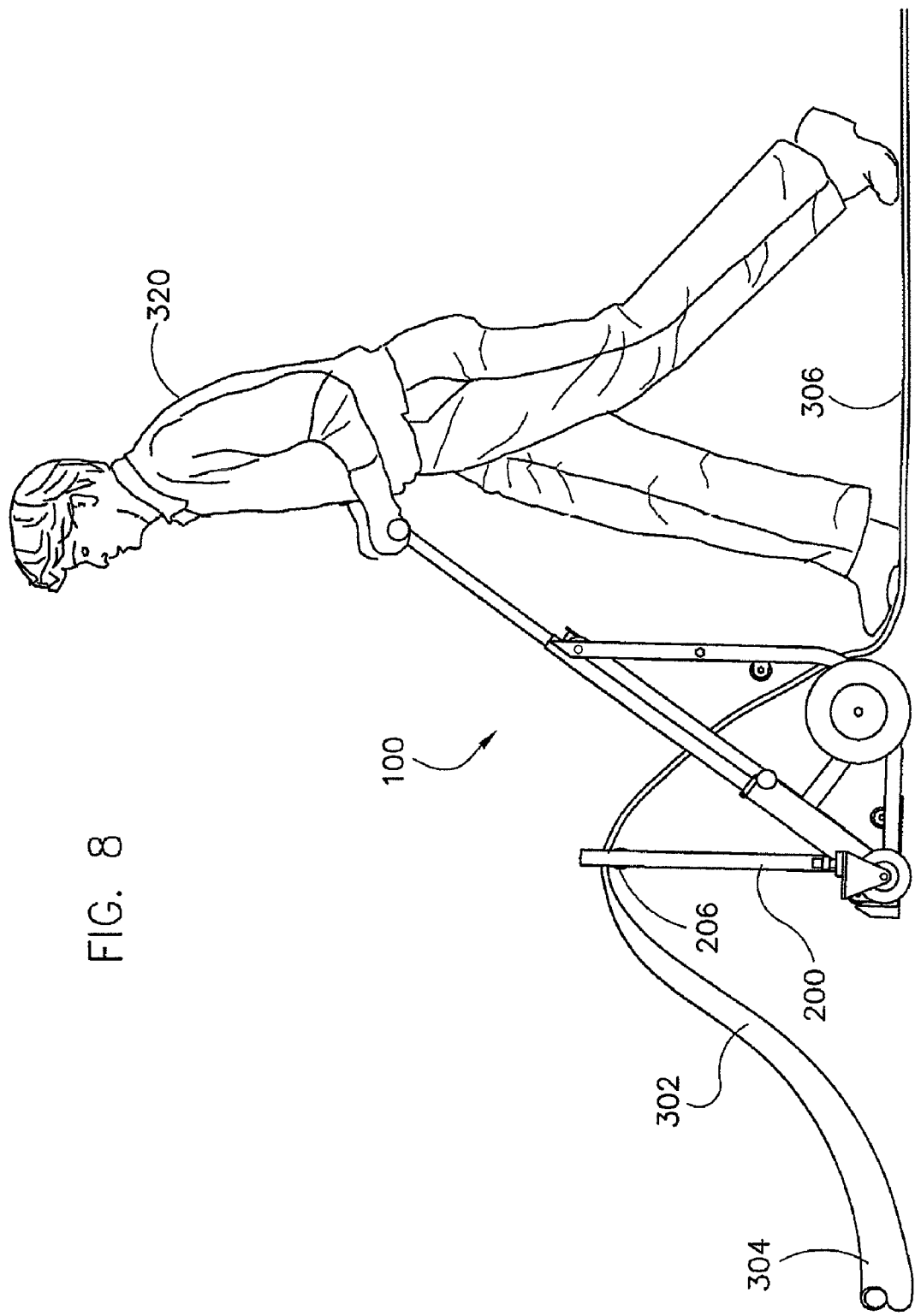
FIG. 8 is a right side elevational view of the apparatus and attachment shown in FIG. 6 and illustrating use of the combination to drain an LDH after use.

In application, the apparatus 100 is intended by this inventor to first be used by a fire fighter to drain a given segment of the LDH 302, as shown in FIG. 8, and then, secondly, to transport a coiled LDH 308 to a fire truck 310 where the LDH is to be stored for transport and re-use, as shown in FIG. 5.

During the first step in the process, the segment of the LDH 302 is laid on the ground or other substantially flat horizontal surface, the segment of the LDH extending linearly between a first end 304 and a second end 306. The apparatus 100 is positioned at the first end 304 of the LDH 302. The first end 304 of the LDH 302 is elevated and draped over the roller 206 of the attachment 200 and through the frame 10 of the apparatus 100. The second end 306 of the LDH 302 is left to lay flat on the ground. The user 320, while walking on the LDH 302, urges the apparatus 100 and the elevated roller 206 along the segment of the LDH 302. As this is done, water inside the segment of LDH 302 is urged forwardly of the roller 206 and towards the second end 306 of the LDH 302. Also during this process, the LDH 302 is effectively flattened as the user 320 walks along the LDH 302. The user 320 continues with this action to the point that the second end 306 of the LDH 302 is reached and most, if not all, of the water is discharged from the LDH 302 by the use of gravity.

In the second step of the process, the user 320 rolls the flattened LDH 302 into a coil 308. The attachment 200 is removed from the apparatus 100. The coil 308 can be tipped upright and then rolled, not lifted, onto the apparatus 100. Depending upon the particular diameter of LDH used, the guide bar 80 is moved along to the point that it will assist the user 320 in maintaining the LDH coil 308 in an upright position during transport back to the fire truck 310. The LDH coil 308 is easily rolled onto the apparatus 100 by virtue of the toe 70, which also prevents the coil 308 from rolling out of the apparatus 100 once it is in place.

Figure 10:
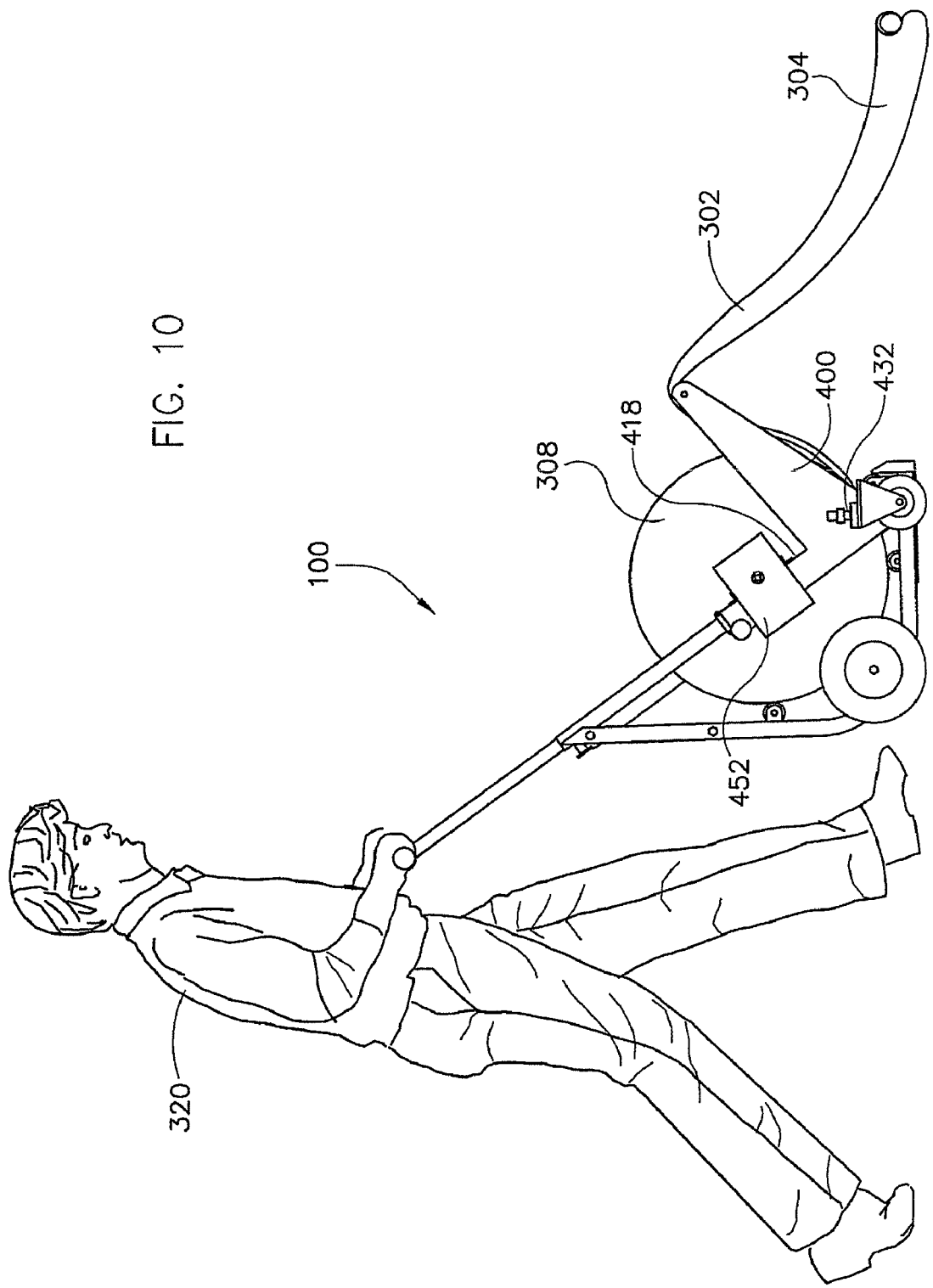
FIG. 10 is a left side elevational view of the apparatus and attachment shown in FIG. 9 and illustrating use of the combination to drain and wind an LDH into a coil after use.

An alternative first and second step is for the user 320 to instead have the alternative embodiment attachment 400 attached to the frame members 12, 22. In similar fashion to the above manual method, the first end 304 of the LDH 302 is placed over the elevated roller 406. That first end 304 is then captured within the keeper 458. The motor 452 is actuated by the user 320 which rotates the winding rod 454. As the winding rod 454 rotates, it pulls the LDH 308 over the elevated roller 406, thereby draining the LDH 308, and then wraps it around the winding rod 454 as the user 320 walks behind the apparatus 100. See FIG. 10. It is to be noted that, during this alternative step, the guide bar 80 is used in the same fashion as it would be with the mounting of the coil 308 into the apparatus 100 by hand, as previously described.

By extending the handle 30 of the apparatus 100, the user 320 can then tip the apparatus 100 backwards, the center of gravity of the combined apparatus 100 and coil 308 being situated just above the wheels 42, 44, and easily move the apparatus 100 in virtually any direction. This allows for smooth and easy transport of the coil 308 by a single user 320, and without any back strain that would otherwise be experienced through lifting of the coil 308. When the apparatus 100 with coil 308 is rolled to the point that it is located to the rear of the fire truck 310 and in close proximity to it, the wheel stops 46, 48 of the apparatus 100 can be set. This prevents movement of the apparatus 100 during unloading of the LDH coil 308. The user 320 will start with the available, and outermost, end of the LDH 302 and pull it into place from atop the bed of the fire truck 310. With continued pulling, the LDH 302 is uncoiled from within the apparatus 100, which is facilitated through rotation of the rollers 62, 64, 66, 68 upon which the coil 308 is primarily resting. This is continued until the complete length of the LDH 302 is properly stowed. In the situation where the second embodiment attachment 400 is used, the attachment 400 may stay in place and the elevated roller 406 made removable by providing slots (not shown) in one or both distal ends of the first and second side members 402, 404, respectively.

The entire process is continued until the last segment of LDH 302 that was used during the fire fight is drained, collected and stored. At this point, the handle 30 is retracted and the apparatus 100 is properly stored at a location on the fire truck 310 as is desired or required.

Based upon the foregoing, it will be apparent that there has been provided a new, useful and non-obvious method for facilitating the removal of water from an LDH after the LDH has been used in a fire fight; which method can also be used to transport a coiled LDH from the drain site to the fire truck onto which the LDH must be re-stacked; and which method can be used to transport LDH of different diameters.

The principles of this invention having been fully explained in connection with the foregoing, I hereby claim as my invention:

1. A method that allows a user to drain and transport a large diameter hose of the type used in fire fighting, the hose having a first end and a second end, the method comprising the steps of:
   providing a hose draining apparatus comprising a frame, said frame comprising a handle, an elevated roller and a lower-most portion, and the frame being movable by virtue of a pair of wheels attached to the lower-most portion of the frame;
   laying the hose in a linear position;
   raising the first end of the hose;
   draping the first end of the hose over the elevated roller of the frame;
   moving the frame from the first hose end to the second hose end while also walking on the hose to effectively flatten the hose;
   wherein water within the hose is discharged from the hose at the second hose end;
   rolling the flattened hose into a coil;
   tipping the coiled hose to an upright position;
   providing the frame of the apparatus with means for holding the coiled hose within the frame;
   rolling the coiled hose onto the frame; and
   transporting the coiled hose held within the frame to a location.

2. The method of claim 1 further comprising, prior to the frame moving step, the step of providing a power driven winding means for winding the hose into a hose coil within the apparatus.

3. The method of claim 2 further comprising the step of actuating the power driven winding means wherein the hose is wound into a coil within the apparatus as the frame is moved towards the second hose end.

4. The method of claim 3 further comprising the steps of:
   providing the frame of the apparatus with means for allowing rotation of the coiled hose within the frame; and
   providing the frame of the apparatus with means to prevent movement of the frame;
   activating the movement prevention means; and
   uncoiling the coiled hose from the apparatus.

5. The method of claim 4 wherein the means for holding the coiled hose comprises a plurality of horizontally disposed rollers, said rollers being disposed in an arcuate relation to facilitate uncoiling of the coiled hose from the frame.

6. The method of claim 3 further comprising the step of providing the frame of the apparatus with a guide bar wherein the guide bar is securable in a plurality of longitudinal positions relative to the frame and the frame includes indicia for indicating to the user a preferred position for the guide bar depending upon the diameter hose to be transported.

7. The method of claim 3 wherein the frame is configured such that the center of gravity of the frame, and of the frame and a coiled hose situated on it, is located directly above the pair of wheels.

8. The method of claim 1 further comprising the steps of:
   providing the frame of the apparatus with means for allowing rotation of the coiled hose within the frame;
   providing the frame of the apparatus with means to prevent movement of the frame;
   activating the movement prevention means; and
   uncoiling the coiled hose from the apparatus.

9. The method of claim 8 wherein the means for holding the coiled hose comprises a plurality of horizontally disposed rollers, said rollers being disposed in an arcuate relation to facilitate uncoiling of the coiled hose from the frame.

10. The method of claim 1 further comprising the step of providing the frame of the apparatus with a guide bar wherein the guide bar is securable in a plurality of longitudinal positions relative to the frame and the frame includes indicia for indicating to the user a preferred position for the guide bar depending upon the diameter hose to be transported.

11. The method of claim 1 wherein the step of rolling the coiled hose onto the frame further comprises the step of providing the frame with a frame toe having a ramped leading edge for facilitating the rolling of the coiled hose onto the frame.

12. The method of claim 1 wherein the frame is configured such that the center of gravity of the frame, and of the frame and a coiled hose situated on it, is located directly above the pair of wheels.

* * * * *